United States Patent
Cho et al.

(10) Patent No.: US 10,422,314 B2
(45) Date of Patent: Sep. 24, 2019

(54) SPIRAL BLADE UNIT AND WIND GENERATOR AND BLADE CONNECTOR FOR THE UNIT

(71) Applicant: Yeoung Cheol Cho, Seoul (KR)

(72) Inventors: Yeoung Cheol Cho, Seoul (KR); Marinus Mieremet, Vinkeveen (NL); Joon-Ho Baek, Daejeon (KR); Bong Sik Kim, Daejeon (KR); Ho Seong Ji, Busan (KR)

(73) Assignee: Yeoung Cheol Cho, Seoul (KR)

( * ) Notice: Subject to any disclaimer, the term of this patent is extended or adjusted under 35 U.S.C. 154(b) by 0 days.

(21) Appl. No.: 15/571,654

(22) PCT Filed: Nov. 10, 2015

(86) PCT No.: PCT/KR2015/012065
§ 371 (c)(1),
(2) Date: Nov. 3, 2017

(87) PCT Pub. No.: WO2016/182151
PCT Pub. Date: Nov. 17, 2016

(65) Prior Publication Data
US 2018/0142669 A1    May 24, 2018

(30) Foreign Application Priority Data
May 14, 2015  (KR) .................. 10-2015-0067495

(51) Int. Cl.
*F02D 1/06* (2006.01)
*F03D 1/06* (2006.01)

(52) U.S. Cl.
CPC ......... *F03D 1/0633* (2013.01); *F03D 1/0608* (2013.01); *F03D 1/0625* (2013.01); *F05B 2250/15* (2013.01); *Y02E 10/721* (2013.01)

(58) Field of Classification Search
CPC ........ F03D 1/06; F03D 1/0633; F03D 1/0608; F03D 1/0625; F05B 2250/15; Y02E 10/721
See application file for complete search history.

(56) References Cited

U.S. PATENT DOCUMENTS 7,948,110 B2 * 5/2011 Morgan .................. F03D 3/005
290/44
2008/0191487 A1    4/2008 Morgan et al.
(Continued)

FOREIGN PATENT DOCUMENTS

CN    103154506 A    6/2013
GB    2451478 A    2/2009
(Continued)

OTHER PUBLICATIONS

International Search Report issued in the corresponding International Application No. PCT/KR2015/012065 dated Jan. 25, 2016.
(Continued)

*Primary Examiner* — Hieu T Vo
(74) *Attorney, Agent, or Firm* — Roberts Mlotkowski Safran Cole & Calderon P.C.

(57) ABSTRACT

A spiral blade unit is disclosed, which generates less blade-sagging, deformation, or vibration, can be made of various material, can be made with light material, and can be installed easily in interconnecting spiral blades. The spiral blade unit includes a rotational axle and spiral blades with root portions attached along an outer circumferential surface of the rotational axle, and the spiral blades are interconnected to one another through a blade connector.

17 Claims, 9 Drawing Sheets

(56) References Cited

U.S. PATENT DOCUMENTS

2010/0140947 A1    6/2010   McEntee et al.
2014/0145447 A1    5/2014   Mieremet

FOREIGN PATENT DOCUMENTS

| | | |
|---|---|---|
| JP | S63-057874 A | 3/1988 |
| JP | 2011-064202 A | 3/2011 |
| KR | 10-0935713 B1 | 1/2010 |
| KR | 10-1286380 B1 | 7/2013 |
| KR | 0-2015-0000643 U | 2/2015 |
| WO | 2013185068 A1 | 12/2013 |
| WO | 2014073741 A1 | 5/2014 |

OTHER PUBLICATIONS

European Search Report issued in the corresponding EP Application No. 15882913.5 on Dec. 19, 2018.
Chinese Examination Report issued in the corresponding Chinese Patent Application No. 201580079979.9 on Nov. 27, 2018.

\* cited by examiner

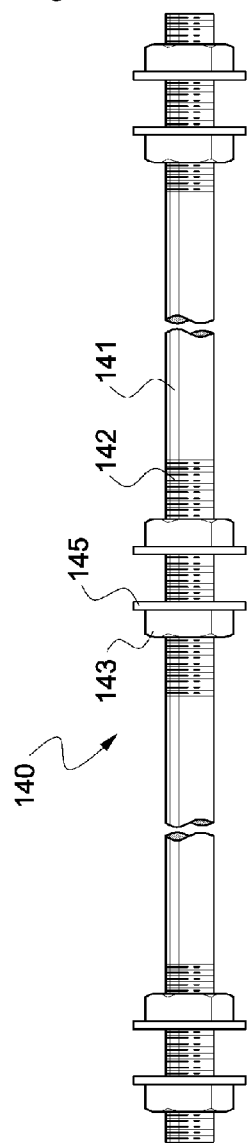
[Fig. 2]

[Fig. 3]
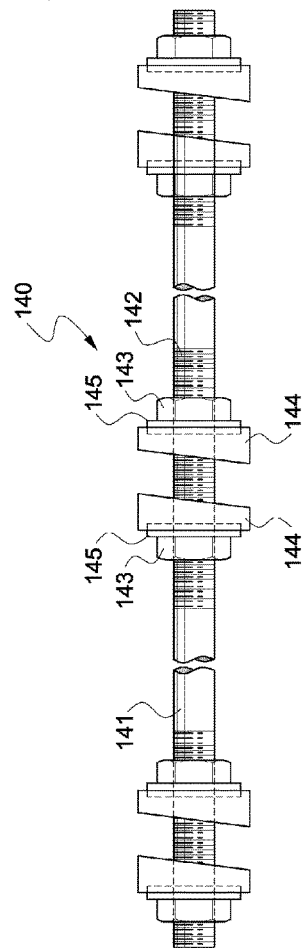
[Fig. 4]
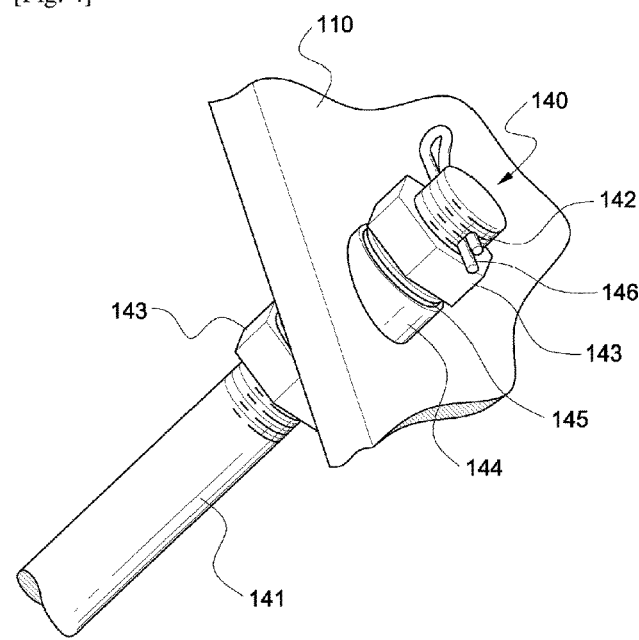

[Fig. 5]
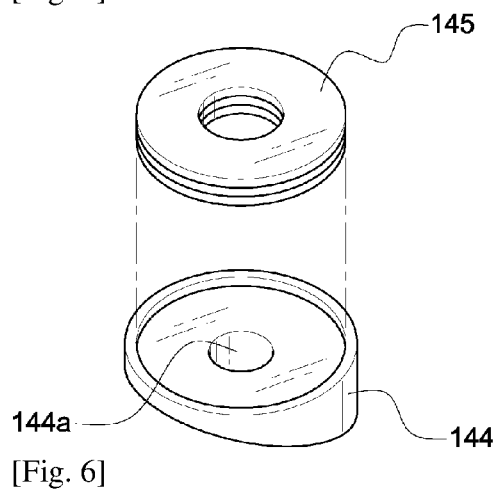
[Fig. 6]
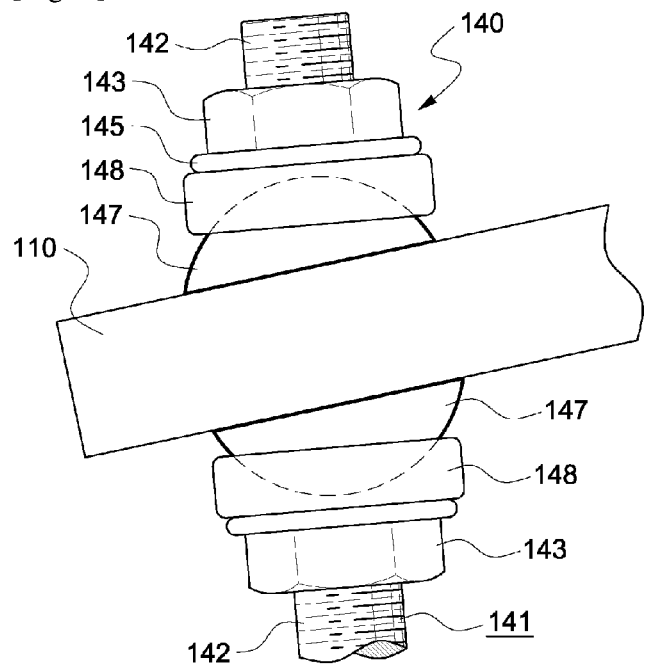

[Fig. 7]
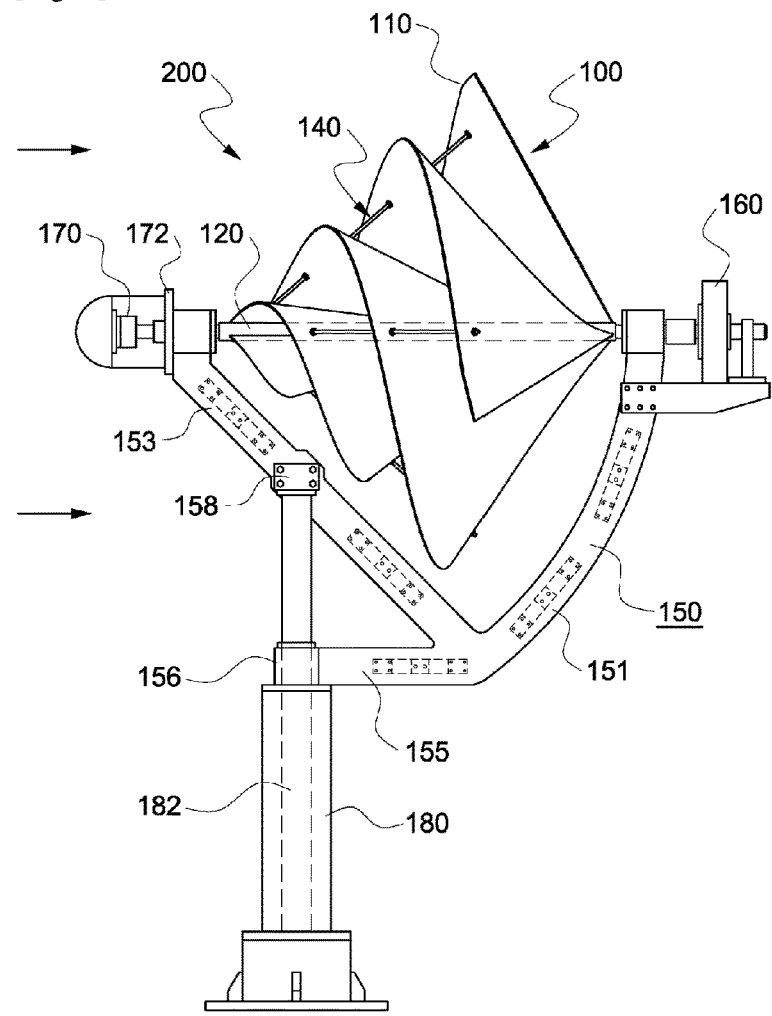
[Fig. 8a]
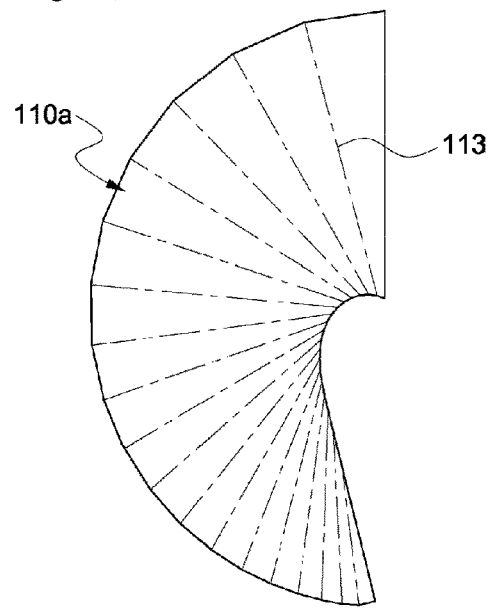

[Fig. 8b]
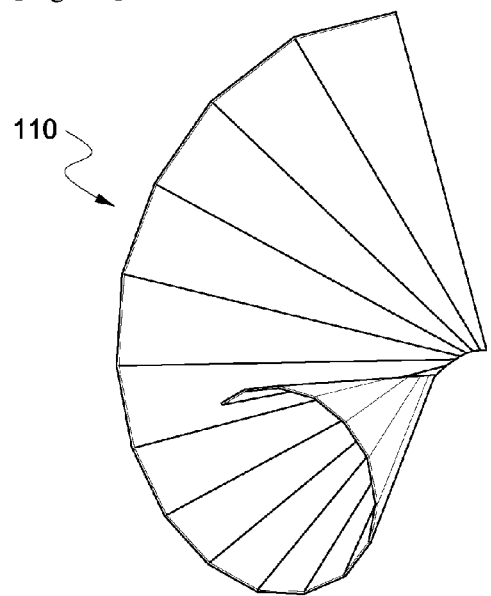
[Fig. 9]
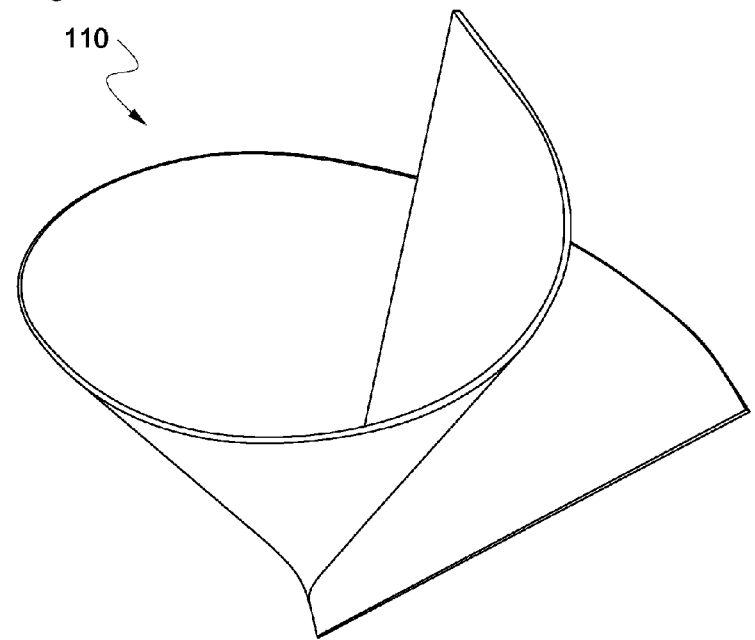

[Fig. 15]
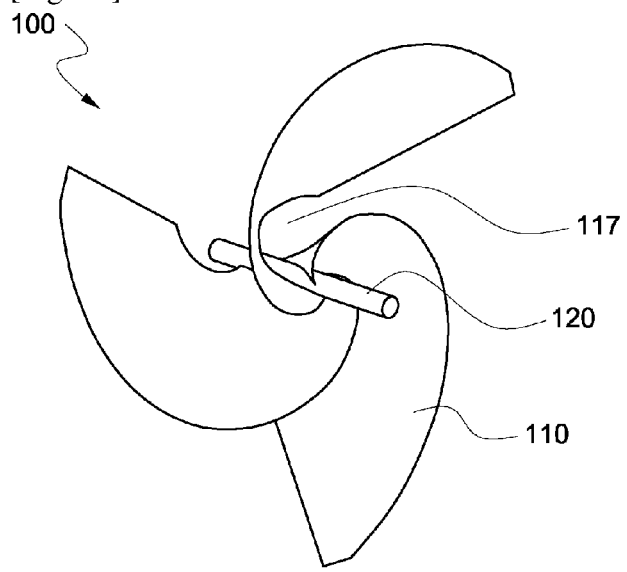
[Fig. 16]
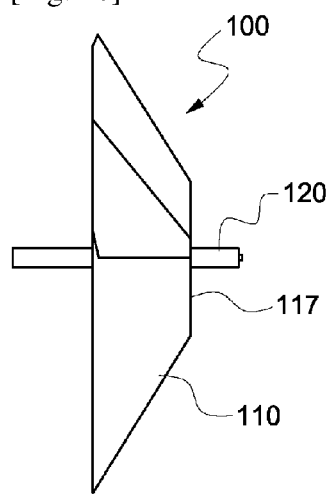

SPIRAL BLADE UNIT AND WIND GENERATOR AND BLADE CONNECTOR FOR THE UNIT

CROSS-REFERENCE TO RELATED APPLICATIONS

The present application is a U.S. National Phase of PCT/KR2015/012065 filed on Nov. 10, 2015 claiming priority to Korean Patent Application No. 10-2015-0067495 filed May 14, 2015. The disclosure of the PCT Application is hereby incorporated by reference into the present Application.

TECHNICAL FIELD

The invention relates to an improvement of a spiral blade unit, more specifically to an improvement of a spiral blade unit adapted to be used for a wind generator.

BACKGROUND ART

Wind generators of various types for generating electricity using wind are known well. The invention relates to a horizontal axle blade unit having spiral blades. Prior arts of each spiral blade mentioned in the invention are described in detail in an international application publication WO 2011/142653 A1 (referred as 'previously-filed invention' below). The technological contents related to each blade described in the international application publication is incorporated by reference as a prior art to the invention by citing the international application publication.

In general, the wind generator includes a blade unit comprising a rotational axle and a plurality of blades engaging the rotational axle and disposed around the rotational axle for obtaining rotational torque from wind.

The blade unit having spiral blades is difficult to manufacture integrally by injection molding or casting due to a designing structure of preferably three blades.

Therefore, spiral blades are manufactured individually separately from the rotational axle, and then must be fixed to an outer circumferential surface of the rotational axle strongly with even intervals. In order to fix the spiral blades strongly, it was tried that a frame is installed on the rotational axle's outer circumferential surface having a hexagonal cross-section using bolts and a root portion of each blade is to be fixed to the frame using bolt and nut, but there were problems that strength of the rotational axle was weakened due to multiple bolt hole, weight of the spiral blade unit increases a lot due to the usage of many bolts and nuts, engaging bolt and nut are loosened if used for an extended time period, and it takes long hours to manufacture and assembly the rotational axle and frames.

DISCLOSURE OF INVENTION

Technical Problem

The inventor recognized that since a blade unit having spiral blade units the ratio of area receiving wind within the blade's rotational region is very large than a blade unit having regular blades, if the wind gets stronger, a problem can happen that each blade generates a bending deformation and serious vibration generates due to unbalance of forces on each blade and can damage the blade. The invention is for improving the shortcomings of those problems.

Another object of the invention is to provide a spiral blade unit that can use various materials for the spiral blade and a wind generator using such a spiral blade unit.

Still another object of the invention is to provide a spiral blade unit that generates less vibration on the spiral blade and reduces the possibility of being damaged from vibration and a wind generator using such a spiral blade unit.

Still another object of the invention is to provide a blade connector that connects and supports strongly spiral blades.

Solution to Problem

A spiral blade unit according to the present invention comprises a rotational axle, and spiral blades, a root portion of each of which being fixed on a outer circumferential surface of the rotational axle, and the spiral blades are connected with one another through a blade connector.

It is preferable that the blade connector comprises a connecting member penetrating the spiral blades and installed toward the rotational axle and configured for supporting by connecting outer edges of the spiral blades in directions tilted with respect to the rotational axle.

Sometimes, the blade connector comprises a ring member interconnecting the outer edges of the spiral blades.

The blade connector preferably interconnects outer edges of the spiral blades in tilted direction with respect to the rotational axle so as to support them.

The blade connector comprises: a connecting member having threads formed on an outer circumferential surface; washers engaging the outer circumferential surface of the connecting member; and a plurality of nuts engaging the threads, pressing down on a surface of the spiral blade so as to fix the spiral blade to the connecting member, or comprises the connecting member formed with a ring groove and a ring member engaging the ring groove and preventing the spiral blades from vibrating.

Preferably, the blade connector further comprises a slope member engaging the outer circumferential surface of the connecting member between the surface of the spiral blade and the nut and compensating a slope of the spiral blade.

Sometimes, the blade connector may further comprise: a first spherical member engaging the outer circumferential surface of the connecting member between the surface of the spiral blade and the nut and formed with convex or concave spherical surface on an outer surface; and a second spherical member engaging on the outer circumferential surface of the connecting member, disposed outside of the first spherical member, and formed with concave or convex spherical surface on an inner surface that is to be engaged with the convex or concave spherical surface of the first spherical member.

Preferably, the planar figure of the spiral blade has a form, which has a shape of cutting out a portion of semi-circle along a J-shaped curve at one side radius portion of the center of the semi-circle from the semi-circle or a shape of that a portion near to the center of the semi-circle is removed from the shape of cutting out so as to be formed an air-venting hole in a rear portion of the spiral blade unit.

The spiral blade may be manufactured by any one of making with an FRP by an FRP molding method, making with plastic by injection molding method, making with metal by die-casting method, making by bending metal plate, installing membrane member on a blade-shaped frame, making by bending metal plate with holes, making by enclosing with a membrane member an outer surface of one made by bending metal plate with holes or blocking the holes with material lighter that the metal plate, making by forming a membrane blocking the holes on a surface of one made by bending metal plate with holes, and making by welding blade pieces.

Sometimes, the blade connector may comprise a ring member disposed in circumferential direction about the rotational axle and interconnecting the spiral blades.

Preferably, the nuts and elements that are pressed toward a surface of the spiral blade by the nuts may be installed on both surfaces of the spiral blade.

A wind generator according to the invention comprises: a spiral blade unit according to the invention; a supporting frame supporting both ends of the rotational axle of the spiral blade unit horizontally and rotatably and installed so as to rotate in place about a vertical axle; and a generator engaging the rotational axle and generating electricity.

It is preferable that the supporting frame comprises a first frame element extending downwards from an end of the rotational axle, a second frame element extending obliquely downwards from the other end of the rotational axle and meeting the first frame element, and a third frame element having a first axle-engaging portion that extends toward the vertical axle from a portion where the first and second frame elements meet each other and engages an outer circumferential surface of the vertical axle.

Preferably, a second axle-engaging portion is installed between both ends of the second frame element, which engages the vertical axle passing the first axle-engaging portion and extending upwards and is supported by the vertical axle.

According to the invention, a blade connector for interconnecting spiral blades disposed with intervals, the blade connector comprising: a connecting member for connecting the spiral blades; and a plurality of fixing means engaged to an outer circumferential surface of the connecting member and fixing the spiral blades to be interconnected to the connecting member.

Threads may be formed on the outer circumferential surface of the connecting member and the fixing means includes nuts engaging the threads, or a ring groove may be formed on the outer circumferential surface of the connecting member and the fixing means comprises a ring member engaged to the ring groove and preventing the spiral blade from vibrating.

The blade connector may comprise a slope member, which is engaged to the outer circumferential surface of the connecting member between the nut and a surface of the spiral blade and compensates a slope of the spiral blade.

The blade connector may further comprise: a first spherical member engaging the outer circumferential surface of the connecting member between the surface of the spiral blade and the nut and formed with convex or concave spherical surface on an outer surface; and a second spherical member engaging on the outer circumferential surface of the connecting member, disposed outside the first spherical member, and formed with convex or concave spherical surface on an inner surface that is to be engaged with the concave or convex spherical surface of the first spherical member.

It is preferable that on the outer circumferential surface of the connecting member are alternatingly disposed in a length direction a section formed with threads and a section without threads.

Advantageous Effects of Invention

According to the invention, since the spiral blades are interconnected with and supported one another through a blade connector, the spiral blade unit generates less blade-sagging, deformation, or vibration and has a long life.

According to the invention, since the spiral blades are interconnected with one another so as to support, it can be made with relatively weak material.

According to the invention, since the spiral blades are interconnected with one another so as to support, it can be made with relatively light material.

If using a blade connector according to the invention, interconnecting of the spiral blades can be done easily, and it can have a solid and stable connecting structure.

BRIEF DESCRIPTION OF DRAWINGS

FIG. 2 is a side view of a blade connector according to the invention;

FIG. 3 is a side view of another example of a blade connector according to the invention;

FIG. 4 is an enlarged view of an engaging portion of the blade connector of FIG. 3;

FIG. 5 is a perspective view of a slope member and a washer of FIG. 3;

FIG. 6 is a partially enlarged view showing a varied embodiment of a blade connector;

FIG. 7 is a side view showing a wind generator using a spiral blade unit according to the present invention;

FIG. 8 is a diagram for explaining an example of making a spiral blade using a metal plate;

FIGS. 9 and 10 are diagrams for explaining variations of FIG. 8;

FIGS. 15 and 16 are a perspective view and a side view showing still another variation of a spiral blade unit.

100: spiral blade unit 110: spiral blade
110a: planar figure 115: hole
120: rotational axle 140: blade connector
141: connecting member 142: threads
143: nut 144: slope member
145: washer 147: first spherical member
148: second spherical member 150: supporting frame
160: generator 172: brake
182: vertical axle 200: wind generator

BEST MODE FOR CARRYING OUT THE INVENTION

Figure 1:
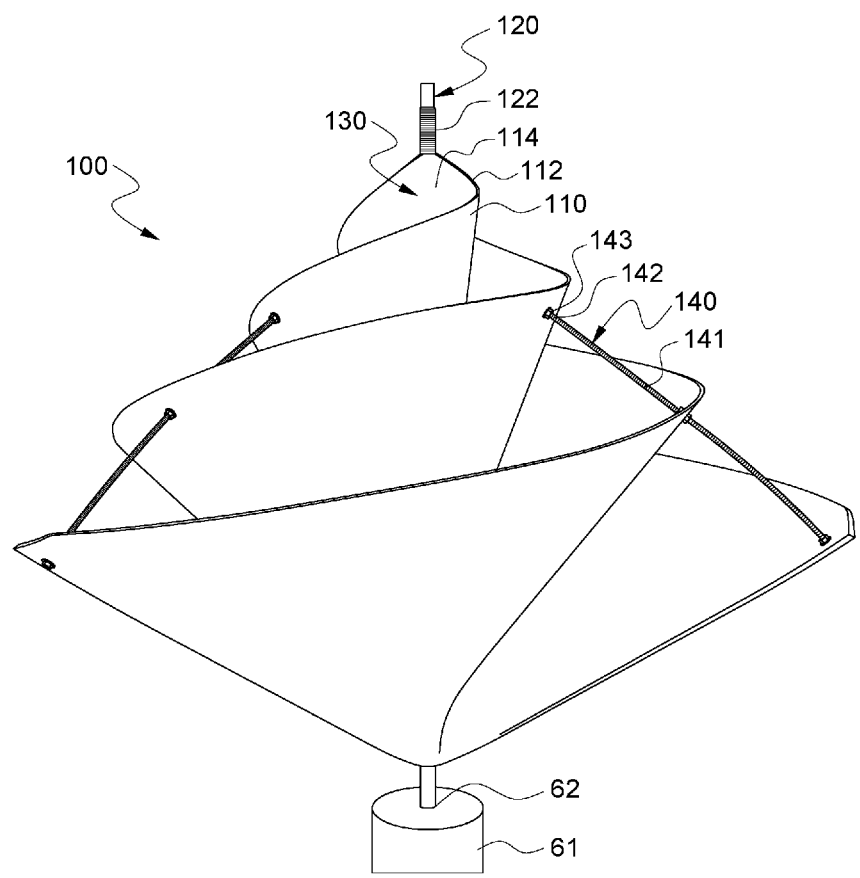
FIG. 1 is a picture showing an example of a spiral blade unit according to the invention.

FIG. 1 is a picture showing an example of a spiral blade unit according to the invention, and FIG. 2 is a side view of a blade connector according to the invention.

Referring to FIG. 1, a spiral blade unit (100) according to the invention includes a rotational axle in the center and a plurality of spiral blades (110) having root portions attached along outer circumferential surface of the rotational axle (120). The spiral blade (110) according to the embodiment is made of FRP using a method such as hand lay-up, etc.

The rotational axle (120) in the center is appropriate to make with metal, which more preferably can be hollow metal pipe. On the outer circumferential surface of such a rotational axle (120) are preferably formed threads (122) for engaging with the spiral blade (110) firmly.

The spiral blade (110) may be formed with a perimeter (112) along outer edges thereof. This embodiment shows that the spiral blades (110) are fixed to outer circumferential surface of the rotational axle (120) by forming a FRP laminating portion (130) by laminating FRP material across the root portion (114) of the spiral blades (110) and the outer circumferential surface of the rotational axle (120) formed with the threads (122) in a state that the spiral blades (110) are fixed to a jig. After fixing, a top jig on the bottom jig (61) holding the spiral blade (110) is removed, leaving the bottom jig (61) only. The rotational axle (120) is combined to the groove (62) formed in a center of the bottom jig (61).

Referring to FIGS. 1 and 2, a spiral blade unit (100) according to the invention further comprises a blade connector (140) for interconnecting the spiral blades (110) radially. The spiral blades (110) are interconnected with one another through the blade connector (140), supporting one another.

Since the spiral blades (110) generate the largest displacement and vibration at an outer edge farthest from the rotational axle (120), the blade connector (140) is preferably installed to connect outer edges of the spiral blades (110) as shown in FIG. 1. In such a case the blade connector (140) is installed in a tilted direction with respect to the rotational axle (120).

Preferably, the blade connector (140) has a connecting member (141), which penetrates the spiral blades (110) and is installed toward the rotational axle (120) from outside. On the outer circumferential surface of the connecting member (141) are formed threads (142). The threads (142) may be formed along entire length of the connecting member (141), but as shown in FIG. 2 it is preferable to form in partial segments of in the length direction of the connecting member (141).

The blade connector (140) includes a plurality of nuts (143) engaging the threads (142) and fixing the spiral blades (110) to the connecting member (141), as a fixing means for fixing the spiral blade (110) to the connecting member (141). Sometimes, it may be fixed as in a state that the nut (143) presses down on a surface of the spiral blade (110) directly, but preferably using the one as shown in FIG. 2, washers (145) combined on the outer circumferential surface of the connecting member (141) between a surface of the spiral blade (110) and the nut (143) are used. In such a case, the nuts (143) are engaged to the threads (142), press down the washers (145) toward a surface of the spiral blade (110), so that the spiral blade (110) is fixed to the connecting member (141). The nut (143) may be welded to the connecting member (141) integrally after engaging for preventing loosening, and means other than welding may be used.

Preferably, such nut (143) and washer (145) are installed on both side surfaces of the spiral blade (110). Such a blade connector (140) performs a function of minimizing sagging and vibration of the spiral blade (110).

Sometimes, other than a nut (143) may be used. A method may be used, in which a separate metal member with holes bored may be disposed on both surfaces of the spiral blade (110), the connecting members (141) that are not formed with threads (142) are inserted to the holes, and in a state of pressing down the metal member with holes on the surface of the spiral blade (110) both metal plate and the connecting member (141) are welded, so as to fix the connecting member (141) to the spiral blade (110). In a case that the spiral blade (110) is made of metal plate, the metal member with holes may be fixed to the spiral blade (110) by welding.

The spiral blades (110) interconnected to one another through the blade connector (140) support one another, so that even though the spiral blade unit (100) rotates in a high speed, the end of the spiral blade (110) in prevented from generating displacement or vibration, preventing damage to the spiral blade (110).

The spiral blade (110) may be manufactured with plastic material by using injection mold, not alone with FRP by FRP molding method.

It can be manufactured with plastic by injection molding method, with metal by die-casting method, etc. In a case using a spiral blade (110) that is made of metal, it is preferable to fix it to the rotational axle (120) through welding.

FIG. 3 is a side view of another example of a blade connector according to the invention, FIG. 4 is an enlarged view of an engaging portion of the blade connector of FIG. 3, and FIG. 5 is a perspective view of a slope member and a washer of FIG. 3.

As shown in FIGS. 3 and 4, the blade connector (140) according to the invention provides a connecting member (141). The connecting member (141) must be formed longer than an installing interval of the two blades so as to penetrate more than two spiral blades (110) as shown in FIGS. 1 and 2, and the threads (142) are formed on the outer circumferential surface. The threads (142) preferably are formed on segments partially only where the nut (143) engages. A segment with the threads (142) formed and a segment without threads (142) are disposed alternatingly.

Preferably, the blade connector (140) according to the invention further comprises a slope member (144) as shown in FIGS. 3 to 5. As in FIGS. 1 and 2 the spiral blades (110) may be interconnected to one another through the blade connector (140) without a slope member (144), but in order to increase a reliability of the connecting portion, it is preferable to connect the spiral blades (110) using the blade connector (140) with the slope member (144). Preferably, such a slope member (144) is engaged to the outer circumferential surface of the connecting member (141) between a surface of the spiral blade (110) and the washer (145), compensating slope of the spiral blade (110).

The slope member (144) compensates a surface of the spiral blade (110), which changes its radius of curvature along a circumferential direction and is disposed tiltedly, so that the washer (145) and the nut (143) apply force evenly on the blade surface toward the center of the rotational axle (120) and in a tilted direction with respect to the rotational axle (120). Such a slope member (144) is a portion that makes a surface-contact to a surface of the spiral blade (110), which is shown in FIGS. 3 to 5. As can be seen in FIGS. 3 to 5, the slope member (144) includes a hole (144a) in a central portion for allowing the connecting member (141) to pass through, and has a shape of wedge. For such a slope member (144) one made of rubber material having elasticity such as polyurethane or aluminum is appropriate, and sometimes one made of plastic or iron material may be used. Preferably, on a top surface of the slope member (144) is formed a groove for installing a washer. Instead of the slope member (144) a tilted portion having a shape of slope member on a surface of the spiral blade (110). In such a case, the tilted portion may have a form of protrusion having a tilted surface. Especially, it is such a case when the spiral blade (110) is made by the injection molding method.

The washer (145) is engaged outside the slope member (144), and outwardly from that the nut (143) is engaged, which is engaged to the threads (142) and presses down the washer (145) and the slope member (144) toward a surface of the spiral blade (110).

In order to prevent it from loosening, the nut (143) may be done with welding or damaging the threads after fixing. Sometimes, as shown in FIG. 4, in order to prevent loosening of connection between the spiral blades (110), a nut-anti-loosening pin (146) may be engaged to the connecting member (141). The slope member (144), the washer (145), the nut (143), and the nut-anti-loosening pin (146) may be installed on both surfaces of the spiral blade (110), but since it deforms mainly outwardly the spiral blade (110) may be installed on the outer surface only.

Instead of the nut-anti-loosening pin (146), preferably, silicon filler may be force-inserted in an engaging portion and then the portion may be covered with a cover. Here, for the nut (143), a Nylon insert nut known as Nylock nut in the market would be appropriate.

Additionally, double-nut may be thought to be used, but it is not more preferable than the one described in the above for fully preventing loosening of nut. Also, fixing nut to bolt by welding, bending a tip of the connecting member (141), damaging threads, and inserting U-shaped member at a blade edge for fixing may be used, but since there are pros and cons according to methods, they may be selected and used according to a size of spiral blade unit or usage.

Furthermore, chemical engaging using glue such as Loctite may be used.

In order to increase a reliability and strength, it is preferable to use the slope member (144) if possible, but sometimes it may be done without the slope member (144).

MODE FOR THE INVENTION

FIG. 6 is a partially enlarged view showing a varied embodiment of a blade connector.

Sometimes, instead of the slope member described in FIGS. 3 to 5, the blade connector (140) according to the invention can be formed using members formed with spherical surface.

That is, the blade connector (140) according to the invention provides the connecting member (141) which penetrates more than two spiral blades (110) and has the threads (142) formed on the outer circumferential surface. On the outer circumferential surface of the connecting member (141) is engaged a first spherical member (147) on a side of a surface of the spiral blade (110). The inner surface of the first spherical member (147) makes a surface-contact with the surface of the spiral blade (110). The outer surface of the first spherical member (147) is formed with a convex spherical surface that is convex outwards. Outside the first spherical member (147) is installed a second spherical member (148) formed with a concave spherical surface. The concave spherical surface engages the convex spherical surface, compensates the slope of the surface of the spiral blade (110), and makes the washer (145) and the nut (143) exerts force evenly on the blade surface toward a center of the rotational axle (120) and in a tilted direction with respect to the rotational axle (120). The positions to make the concave spherical surface and the convex spherical surface may be exchanged. The blade connector (140) according to the invention provides a washer (145) disposed outside the second spherical member (148), which engages the circumferential surface of the connecting member (141) and a nut (143), which engages the threads (142), and presses down the first and second spherical surface members (147, 148) and the washer (145) toward the surface of the spiral blade (110).

The rest is same as described referring to FIGS. 3 to 5.

FIG. 7 is a side view showing a wind generator using a spiral blade unit according to the present invention.

A wind generator (200) shown in FIG. 7 includes the spiral blade unit (100) according to the invention. The spiral blade unit (100) is installed so as to be able to rotate about the rotational axle (120) as a center, in a state that the rotational axle (120) is disposed horizontally and both ends are supported on the supporting frame (150).

A generator (160) is engaged to an end of the rotational axle (120), and on the other end is installed a RPM meter (170). Preferably, a brake is further installed on the other end of the rotational axle (120), so that even when the wind is very strong the rotational axle (120) does not exceed a specific RPM. If the blades rotate too fast, the blades and other parts may be damaged.

Sometimes, a stop brake for stopping the rotation of the spiral blade unit (100) if necessary for checking or maintenance. Here, the generator (160) and the brake may exchange their installation positions. In a certain case, the generator (160) and the brake may be installed at a same side.

The supporting frame (150) is installed so as to engage a vertical axle (182) installed rotatably to a support (180) and rotate in place about the vertical axle (182). Such a supporting frame (150) supports both ends of the spiral blade unit (100) horizontally and rotatably.

More specifically, the supporting frame (150) comprises a first frame element (151) extending downwards from an end of the rotational axle (120), a second frame element (153) extending obliquely downwards from the other end of the rotational axle (120) and meeting the first frame element (151), and a third frame element (155) having a first axle-engaging portion (156) that extends toward the vertical axle (182) from a portion where the first and second frame elements (151, 153) meet each other and engages an outer circumferential surface of the vertical axle (182).

Preferably, a second axle-engaging portion (158) is installed between both ends of the second frame element (153), which engages the vertical axle (182) passing the first axle-engaging portion (156) and extending upwards and is supported by the vertical axle (182).

In such a case, it is much more stable and can withstand a strong wind better than when the meeting portion of the first and second frame elements (151, 153) is supported rotatably by the vertical axle (182).

Thus the spiral blade unit (100) according to the invention can rotate horizontally about the vertical axle (182) as a rotational center according to the direction of wind in a state of being supported in the supporting frame (150) and being able to rotate about the rotational axle (120) as a center.

In a state of FIG. 7 when the wind blows in a direction of arrow, the spiral blade unit (100) according to the invention rotates about the rotational axle (120) as a center and operates the generator (160), generating electricity. The number of rotations of the rotational axle (120) is measured in the RPM meter (170) and displayed on a screen. Using data measured in the RPM meter (170) and the amount of generated electricity to calculate amount of generated electricity according to the wind power, the generator (160) can be managed.

When the direction of wind changes, an unbalance of left and right forces of wind appears to the spiral blade (110), and then accordingly the spiral blades (110) according to the invention rotates about the 182 as a center, so that the forces on the left and right sides of the spiral blades (110) resume balance.

Thus, the spiral blade unit (100) according to the invention automatically rotates about the vertical axle (182) as a center in a direction of wind blowing in a state of being supported on the supporting frame (150).

FIG. 8 is a diagram for explaining an example of making a spiral blade using a metal plate.

Sometimes, metal plate such as iron plate, tinplate, various alloy plate, aluminum plate, etc. is cut in a shape of a planar figure plate (110*a*) as shown in FIG. 8*a*, bent along folding line (113) represented by alternated long and short dash line, and then bent multiple times in order and with specific angular intervals as shown in FIG. 8*b*, so as to make the spiral blade (110). Also this planar figure plate (110*a*) includes a blade region that can be defined actually in a circle, by defining with a curve extending from a center of the circle to an edge of the circle and a straight line extending radially from the center to a meeting point of the circumference, and by dividing the circle into a rotor blade region and a removing region. The planar figure plate (110*a*) in this embodiment includes a curve portion and a straight line portion defining the border of the blade region that are positioned in a semi-circle. The planar figure plate (110*a*) has a form, which has a shape of cutting out a portion of semi-circle along a J-shaped curve at one side radius portion of the center of the semi-circle from the semi-circle.

When the spiral blade (110) is made with a metal plate, the connecting member (141) without the threads (142) can be welded and fixed to the spiral blade (110), interconnecting the spiral blades (110). In such a case, a thick portion to be able to be welded is formed on the spiral blade (110), and the connecting member (141) is welded directly, or a metal member with holes described with FIGS. 1 and 2 may be used.

Figure 10:
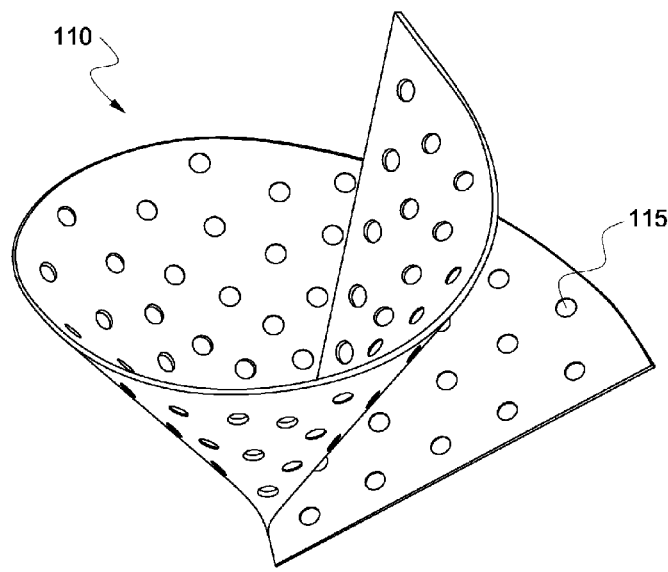

FIGS. 9 and 10 are diagrams for explaining variations of FIG. 8.

Also, sometimes, the spiral blade (110) may be manufactured with metal plate as shown in FIG. 9, by bending using a roller or deforming on a surface of mold having a form of spiral blade a plate cut in a form of the planar figure plate (110*a*) as shown in FIG. 8*a*.

When the spiral blade (110) is manufactured with a metal plate such as steel sheet and the like, a solid steel rod may be used for rotational axle, but hollow pipe-type may be good at vibration and can reduce the weight.

The spiral blade (110) made of metal plate is preferably fixed to the outer circumferential surface of the rotational axle by welding, but sometimes riveting or bolting may be used according to situations. Sometimes, a metal rotational axle set is made by welding a portion of the spiral blade to the outer circumferential surface of the metal rotational axle by a specific length, and then the remaining metal spiral blade (110) may be assembled through methods such as welding, bolting, riveting, etc.

Since the metal is easily welded, parts of the spiral blade (110) can be made in advance and then the spiral blade (110) of desired form can be made by combining them through a method such as welding.

And the spiral blade (110) made of metal such as steel and the like uses a thin sheet, but since the larger the spiral blade (110) gets, the stronger the blade be, the thickness thereof must be increased. If the thickness gets larger, the weight of the spiral blade (110) may get larger than necessary. In such a case, the spiral blade (110) having holes (115) as shown in FIG. 10 by bending or curving metal plate with holes (115) cut in a shape of the planar figure plate (110*a*) multiple times. The holes (115) can be formed elliptical, triangular, rectangular, etc. as well as circular.

As shown in FIG. 10, the spiral blade (110) made of metal plate with holes (115) may be preferably used by blocking the holes (115) by covering and attaching a membrane material on the front side or the front and rear sides or sewing with thread. Or the holes (115) may be blocked by placing a membrane on a surface of the spiral blade (110) made of metal plate with the holes (115) or blocking the holes (115) with a material lighter than the metal material.

Furthermore, in an area of strong wind, the spiral blade (110) may be used with the holes (115) open.

Figure 11:
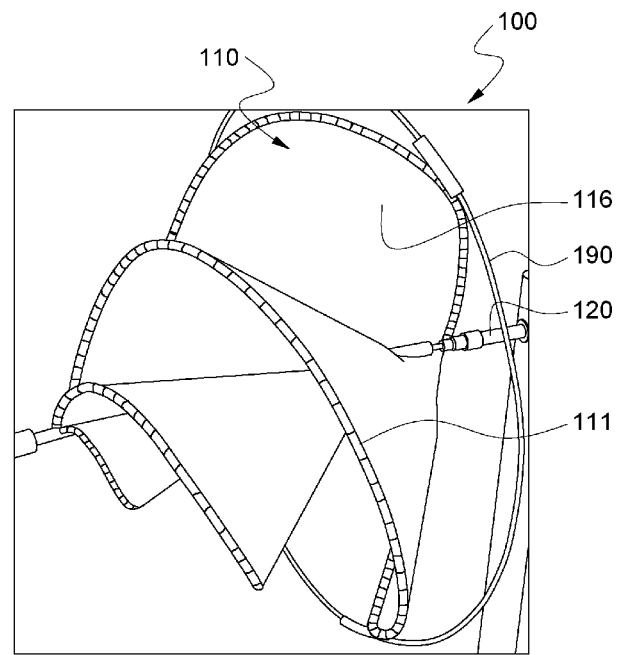
FIG. 11 is a perspective view picture for explaining another embodiment of a rotor blade.
Figure 12:
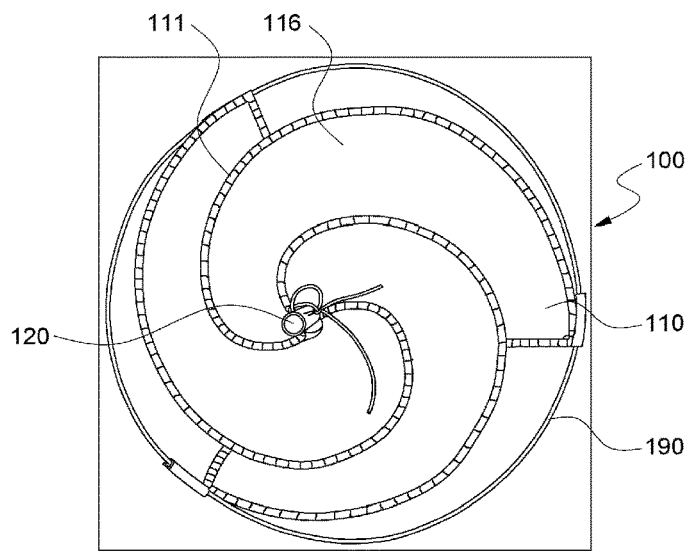
FIG. 12 is a front view picture of the rotor blade of FIG. 11.

FIG. 11 is a perspective view picture for explaining another embodiment of a rotor blade (blade unit), and FIG. 12 is a front view picture of the rotor blade of FIG. 11.

Sometimes, as shown in FIGS. 11 and 12, a frame (111) having a form of the spiral blade (110) is installed around the rotational axle (120), and in the frame (111) is installed a membrane member (116) of fabric, fabric coated with resin, felt, felt impregnated or coated with resin, artificial hide, etc., so that the rotor blade (110) can be installed around the rotational axle (120). The membrane member (116) may be connected by sewing the perimeter to the frame (111). Mesh-type material is installed first before installation of the membrane member (116), and the membrane member (116) may be installed on the outside thereof. In the membrane member (116) may be made holes for sewing to the frame (111) in advance, and it can be connected to the frame (111) through the holes. Sewing and connecting of the membrane member (116) is preferably done not only along the outer perimeter, but also along an inner region, so as to minimize lifting of the membrane member (116) and make a smooth spiral surface. In such a case, the weight of the spiral blade (110) can be reduced much and the cost can be made very cheap, too. For the membrane member (116), various materials with toughness can be used. For example, fabric used for a sail of sailing boat may be used. The frame (111) for installing the membrane member (116) may be formed with various materials, and can be made by assembling parts that are made separately.

And the spiral blades (110) can be strengthened by interconnecting with a ring member (190) disposed in a circumferential direction around the rotational axle (120). The ring member (190) preferably connects the outside of the spiral blade (110) as shown in FIGS. 10 and 11. If the ring member (190) is installed, the vibration of each spiral blade (110) and weight applied to each spiral blade (110) are distributed evenly.

Such a ring member (190) forms a blade connector as a sort of connecting member for connecting the spiral blades. Also in the previous embodiment, at a perimeter of the spiral blades (110) can be formed a ring member engaging portion where the ring member (190) can be engaged for connecting the spiral blades. The ring member (190) with a turn buckle installed can be used, which can adjust the diameter. In such a case, the ring member engaging portion or the turn buckle becomes a fixing means. The connector using the ring member (190) can be installed along with the blade connector of a form having linear connecting member described in the previous embodiment or alone.

As the spiral blade (110) gets larger and larger, the number of the blade connectors for supporting the spiral blades (110) would be high.

In a state shown in FIGS. 11 and 12, using the blade connector (140) described in the above the spiral blade (110) are interconnected.

In an area of weak wind, it can be used without any blade connector installed.

Figure 13:
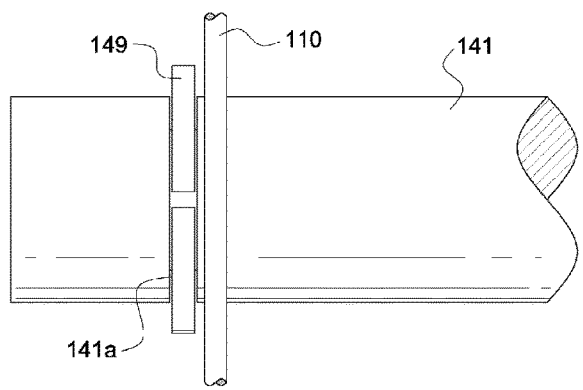
FIG. 13 is a partial side view for explaining still anther embodiment of a blade connector.

FIG. 13 is a partial side view for explaining still anther embodiment of a blade connector.

Sometimes, on an outer circumferential surface of the connecting member (141) is formed a ring groove (141a), and in the ring groove (141a) is installed a ring member (149), so as to prevent the spiral blade (110) from vibrating. Here, the ring groove (141a) and the ring member (149) may be installed outside the spiral blade (110) only, or on both side surfaces inside and outside of the spiral blade (110). For the ring member (149), a stop ring or a split ring with one side split may be used. And for the connecting member (141), a rod member having a rectangular, hexagonal, octagonal cross-section can be used as well as a circular rod having a circular cross-section.

The rest is same as described in the above.

Figure 14:
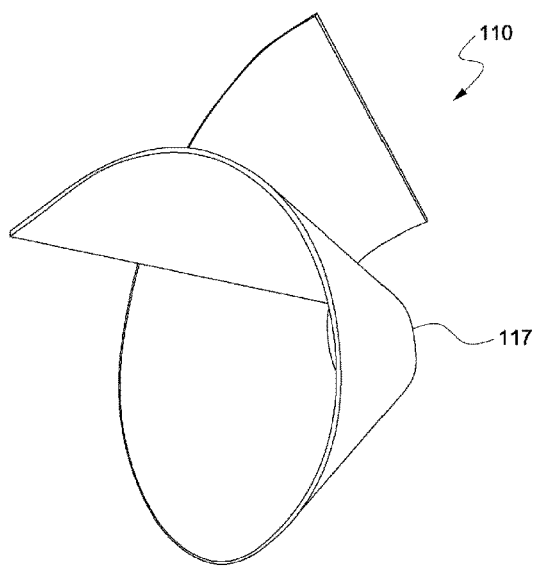
FIG. 14 is a perspective view showing a variation of a spiral blade.

FIG. 14 is a perspective view showing a variation of a spiral blade.

Middle/large-scale wind generators using regular wing-shaped blades reduce wind resistance in a situation of emergency stop by changing the pitch angle of the blades, but the spiral blade cannot use such a method.

Furthermore, since in the case of the spiral blade (110) applied in the invention the area blown by wind is much larger than a regular wing-shaped blade, if the wind blows strongly, a large force is exerted.

The inventor found that when the spiral blade (110) is small it is easy to stop the rotation or reduce the rotational speed even when the wind blows for installing, repairing, etc., but it can be very hard to stop rotation or reduce rotational speed with cases of the middle or large scale.

In order to reduce the wind resistance of the spiral blade (110) of the invention, as shown in FIG. 14, the inventor suggests removing a rear portion of the spiral blade (110) and installing a wind-resistance reducing air-venting hole (117). If installing the wind-resistance reducing air-venting hole (117) as such, even though the spiral blade unit (100) becomes middle or large scale, the spiral blade unit (100) can easily be stopped or reduce the rotational speed if necessary.

In the spiral blade (110) of FIG. 14, an edge in the central portion forming a root portion to be fixed to the rotational axle is straight line, but the portion may be formed spiral as shown in FIG. 15.

The rest is same as described in the above.

FIGS. 15 and 16 are a perspective view and a side view showing still another variation of a spiral blade unit.

Sometimes, in the spiral blade (110) shown in FIG. 14, if the portion fixed to the rotational axle (120) is fixed spirally around the rotational axle (120), torque by wind coming in from the root portion fixed to the rotational axle (120) can be generated. The effects get larger with middle or large-scale cases.

On the other hand, in a case of long rotational axle (120), flapping or vibration can be generated on both ends of the rotational axle (120), so that the rotation limit can be hard to make larger than 400 rpm, it is hard to balance the spiral blade (110), and even though using fixed axle on both ends the life of bearing is shorted due to vibration built up at the long axle, etc. It is required to reduce the length of the rotational axle (120) considering vibration, balancing, increasing of rotation limit, etc.

According to the embodiment, by removing a rear partial portion of the spiral blade (110), the length of the rotational axle (120) can be reduced a lot as shown in FIGS. 15 and 16, and all the problems from long rotational axle (120) can be solved.

If describing about the spiral blade (110) in this embodiment referring to FIG. 8a, the planar figure plate of the spiral blade (110) may have a shape of that a portion near to the center of the semi-circle is removed from the shape of the planar figure plate as shown in FIG. 8a, in which a radial partial portion of a semi-circle at an edge from the center is removed along a J-shaped curve.

And an edge at an outside tip of the spiral blade (110) has a shape of being partially removed, maintaining as large angle as possible or round, and preventing damage from colliding with other object.

The rest is same as described in the previous embodiment.

INDUSTRIAL APPLICABILITY

The invention may be used in manufacturing a spiral blade unit suitable for wind power generation. The spiral blade unit according to the invention may be used in water power generation.

The invention claimed is:

1. A spiral blade unit comprising: a rotational axle; and spiral blades, a root portion of each of which being fixed on an outer circumferential surface of the rotational axle, wherein the spiral blades are connected with one another through a blade connector.

2. The spiral blade unit of claim 1, wherein the blade connector comprises a connecting member penetrating the spiral blades and installed toward the rotational axle and configured for supporting by connecting outer edges of the spiral blades in directions tilted with respect to the rotational axle, or comprises a ring member interconnecting the outer edges of the spiral blades.

3. The spiral blade unit of claim 1, wherein the blade connector comprises: a connecting member having threads formed on an outer circumferential surface; washers engaging the outer circumferential surface of the connecting member; and a plurality of nuts engaging the threads, pressing down on a surface of the spiral blade so as to fix the spiral blade to the connecting member, or comprises the connecting member formed with a ring groove and a ring member engaging the ring groove and preventing the spiral blades from vibrating.

4. The spiral blade unit of claim 3, wherein the blade connector further comprises a slope member engaging the outer circumferential surface of the connecting member between the surface of the spiral blade and the nut and compensating a slope of the spiral blade.

5. The spiral blade unit of claim 3, wherein the blade connector further comprises: a first spherical member engaging the outer circumferential surface of the connecting member between the surface of the spiral blade and the nut and formed with convex or concave spherical surface on an outer surface; and a second spherical member engaging on the outer circumferential surface of the connecting member, disposed outside of the first spherical member, and formed with concave or convex spherical surface on an inner surface that is to be engaged with the convex or concave spherical surface of the first spherical member.

6. The spiral blade unit of claim 1, wherein the planar figure of the spiral blade has a form, which has a shape of cutting out a portion of semi-circle along a J-shaped curve at one side radius portion of the center of the semi-circle from the semi-circle or a shape of that a portion near to the center of the semi-circle is removed from the shape of cutting out so as to be formed an air-venting hole in a rear portion of the spiral blade unit.

7. The spiral blade unit of claim 1, wherein the spiral blade is manufactured by any one of making with an FRP by an FRP molding method, making with plastic by injection molding method, making with metal by die-casting method, making by bending metal plate, installing membrane member on a blade-shaped frame, making by bending metal plate with holes, making by enclosing with a membrane member an outer surface of one made by bending metal plate with holes or blocking the holes with material lighter that the metal plate, making by forming a membrane blocking the holes on a surface of one made by bending metal plate with holes, and making by welding blade pieces.

8. The spiral blade unit of claim 1, wherein the blade connector comprises a ring member disposed in circumferential direction about the rotational axle and interconnecting the spiral blades.

9. The spiral blade unit of claim 1, wherein the nuts and elements that are pressed toward a surface of the spiral blade by the nuts are installed on both surfaces of the spiral blade.

10. A wind generator comprising: a spiral blade unit according to claim 1; a supporting frame supporting both ends of the rotational axle of the spiral blade unit horizontally and rotatably and installed so as to rotate in place about a vertical axle; and a generator engaging the rotational axle and generating electricity.

11. The wind generator of claim 10, wherein the supporting frame comprises a first frame element extending downwards from an end of the rotational axle, a second frame element extending obliquely downwards from the other end of the rotational axle and meeting the first frame element, and a third frame element having a first axle-engaging portion that extends toward the vertical axle from a portion where the first and second frame elements meet each other and engages an outer circumferential surface of the vertical axle.

12. The wind generator of claim 11, wherein a second axle-engaging portion is installed between both ends of the second frame element, which engages the vertical axle passing the first axle-engaging portion and extending upwards and is supported by the vertical axle.

13. A blade connector for interconnecting spiral blades disposed with intervals, the blade connector comprising: a connecting member for connecting the spiral blades; and a plurality of fixing means engaged to an outer circumferential surface of the connecting member and fixing the spiral blades to be interconnected to the connecting member.

14. The blade connector of claim 13, wherein threads are formed on the outer circumferential surface of the connecting member and the fixing means includes nuts engaging the threads, or wherein a ring groove is formed on the outer circumferential surface of the connecting member and the fixing means comprises a ring member engaged to the ring groove and preventing the spiral blade from vibrating.

15. The blade connector of claim 14, further comprising a slope member, which is engaged to the outer circumferential surface of the connecting member between the nut and a surface of the spiral blade and compensates a slope of the spiral blade.

16. The blade connector of claim 14, wherein further comprising: a first spherical member engaging the outer circumferential surface of the connecting member between the surface of the spiral blade and the nut and formed with convex or concave spherical surface on an outer surface; and a second spherical member engaging on the outer circumferential surface of the connecting member, disposed outside the first spherical member, and formed with concave or convex spherical surface on an inner surface that is to be engaged with the convex or concave spherical surface of the first spherical member.

17. The blade connector of claim 14, wherein on the outer circumferential surface of the connecting member are alternatingly disposed in a length direction a section formed with threads and a section without threads.

* * * * *